United States Patent [19]

Berry

[11] 4,224,881

[45] Sep. 30, 1980

[54] TABLE

[76] Inventor: James F. Berry, Dover, Del.

[21] Appl. No.: 946,749

[22] Filed: Sep. 29, 1978

[51] Int. Cl.[3] .......... A47B 13/00; A01N 3/00

[52] U.S. Cl. .......... 108/150; 108/161; 428/18

[58] Field of Search .......... 428/537, 541, 15, 18, 428/22; 144/309 A, 321, 312, 208, 193 R, 354, 311, 314, 315, 322; D6/177; 52/233, DIG. 9; 108/161, 150

[56] References Cited

U.S. PATENT DOCUMENTS

| | | | |
|---|---|---|---|
| D. 220,768 | 5/1971 | Jordan | D6/177 |
| 1,606,354 | 11/1926 | Fillion | 428/18 |
| 1,710,947 | 4/1929 | Payne | 52/233 X |
| 2,508,959 | 5/1950 | Marino | 428/18 X |
| 3,913,644 | 10/1975 | Braun | 144/208 R |
| 4,111,247 | 9/1978 | Hasenwinkle | 144/312 X |

FOREIGN PATENT DOCUMENTS

| | | | |
|---|---|---|---|
| 29303 | 2/1958 | Finland | 144/193 R |
| 1326960 | 4/1963 | France | 108/150 |
| 563693 | 6/1957 | Italy | 428/18 |
| 48054 | 2/1964 | Poland | 144/193 R |

OTHER PUBLICATIONS

*Furniture Making and Cabinet Work,* by B. W. Pelton, 1949, p. 213.

*Wood Furniture,* by James E. Brumbaugh, 1974, p. 180.

*Primary Examiner*—James T. McCall

*Attorney, Agent, or Firm*—Connolly and Hutz

[57] ABSTRACT

A table is made by cutting a portion of a tree trunk longitudinally with one limb remaining thereon which is cut parallel to the tree trunk so that the truncated limb comprises a support for the trunk, the flat surface of which functions as a table top.

11 Claims, 4 Drawing Figures

TABLE

BACKGROUND OF INVENTION

Various forms of tables such as cocktail tables have been utilized by those in the art. Generally the tables are formed from wood or other suitable material having the parts thereof secured in a conventional fashion to form the resulting table.

In accordance with the tastes of the consumer, different styles of tables are created. One style is a natural appearance wherein the table is intended to look like a portion of a tree. This is accomplished by either using a portion of the tree itself or by using materials which simulate a natural tree. Such approaches, however, such as exemplified in Design Pat. No. 220,768 take the form of cutting a tree trunk transversely to its longitudinal axis and additionally cutting a plurality of limbs so that flat surfaces from the trunk and limbs are coplaner to support a separate component as the table top.

SUMMARY OF INVENTION

An object of this invention is to provide a table made from a natural tree itself.

A further object of this invention is to provide a table which is made by a totally different approach than taken by the art so as to result in an entirely different type of table.

In accordance with this invention a portion of a trunk is cut, not transversely as conventionally done, but rather longitudinally. The trunk portion is so selected as to have at least one limb of substantial size which likewise is cut so as to result in a flat surface parallel to the flat surface resulting from a longitudinal cut of the trunk. The limb, or more accurately, the truncated portion of the limb, then functions as a support or pedestal for the trunk portion which in turn functions as the table top.

In accordance with one practice of this invention, a base member which itself may comprise a portion of a tree may be secured to the limb to provide added stability thereto.

THE DRAWINGS

DETAILED DESCRIPTION

Figure 1:
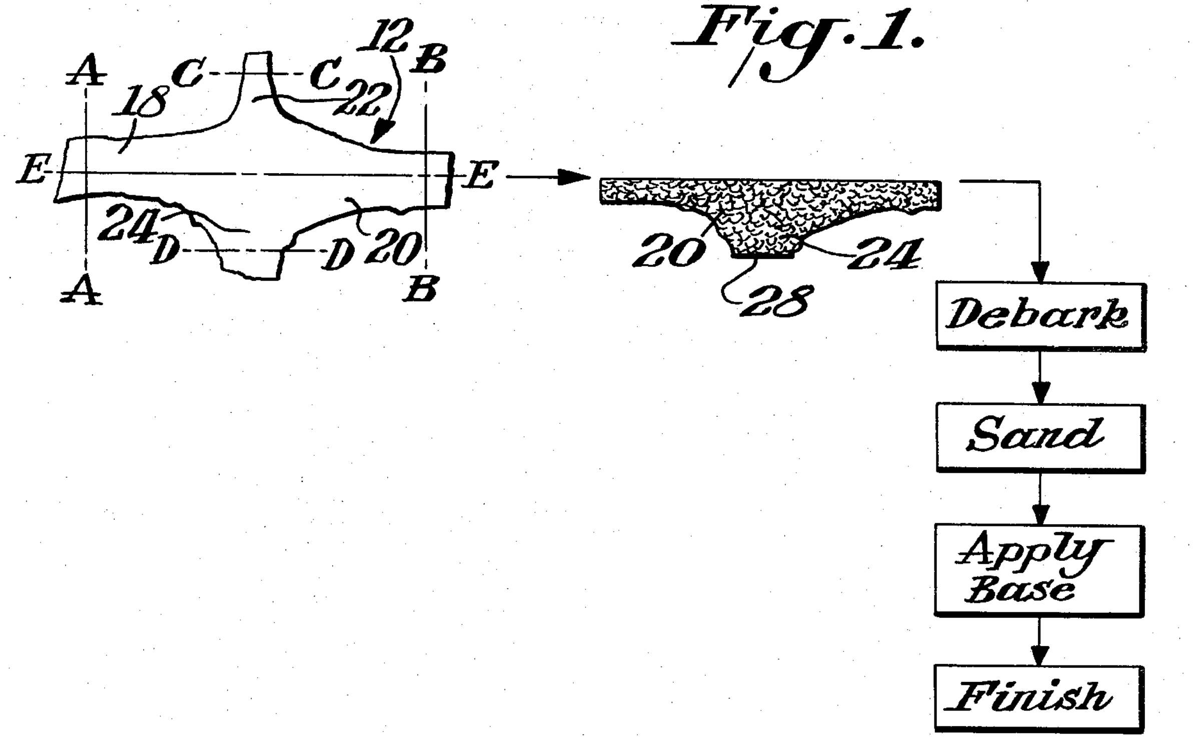
FIG. 1 is a diagram showing the steps taken for producing a table in accordance with this invention.
Figure 2:
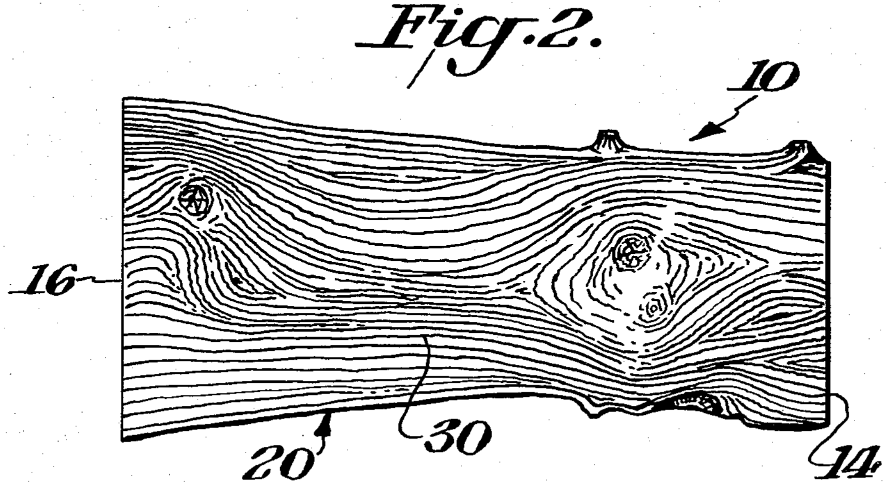
FIG. 2 is a top plan view of a table formed in accordance with FIG. 1.
Figure 4:
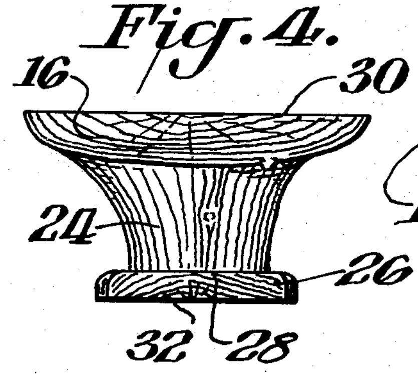
FIG. 4 is an end elevation view of the table shown in FIGS. 2-3.
Figure 3:
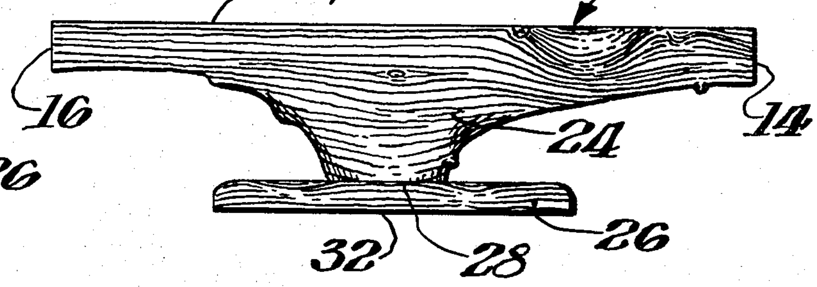
FIG. 3 is a side elevation view of the table shown in FIG. 1.

FIGS. 2-4 illustrate a table 10 in accordance with this invention. The table 10 is formed by utilizing the steps indicated in FIG. 1. As shown therein a portion of a tree 12 is cut in any suitable manner along the lines A—A and B—B transversely to the longitudinal axis of the trunk. As later described, the surfaces resulting from these cuts create the ends 14, 16, resp., of the table 10. Unlike the approaches taken by the prior art, the trunk is cut longitudinally along the line F-E so as to result in two trunk portions 18, 20. This section of the tree is so selected that each usable trunk portion has a limb 22, 24 of substantial dimension. Similarly each limb 22, 24 is cut along the lines C—C and D—D, resp., to create flat surfaces parallel to the flat surface of trunk sections 18, 20 resulting from longitudinal cut F-E.

FIG. 1 illustrates one such tree portion resulting from the aforementioned cutting operation. At this stage of manufacture, if trunk portion 20 contains limbs other than truncated limb 24 or contains other undesired appendages, these extraneous appendages are removed.

As also shown in FIG. 1, after the tree portion having trunk segment 20 with truncated limb 24 is formed, the tree portion is debarked. Next, the debarked tree portion is sanded or otherwise made smooth and given a rough finish. If desired, truncated limb 24 may function as the support for trunk segment 20. In a preferred form of this invention, however, a base 26 is attached to the remote flat end 28 of limb 24. Preferably base 26 is likewise made for a portion of a natural tree and preferably the portion likewise results from a longitudinal cut of a tree so as to better conform in appearance to the flat upper surface 30 of trunk segment 20. If desired, base 26 may be obtained from a thinner portion of the same tree or from a portion of the same tree which does not have a suitable limb.

Although it is desirable that base 26 result from a longitudinal cut of a tree, it is within the concepts of this invention to utilize a portion of a tree made by parallel transverse cuts. Similarly, if desired, cut D—D may be made an angle to cut E—E and base 26 would have a complimentary shape slanted so that its lower surface 32 would be parallel to the upper surface 30 of trunk segment 18. The base would likewise be debarked and sanded before being secured to limb 24.

It is also within the concepts of this invention, but not as desirable, to form the base from any type of material other than a portion of a natural tree. As indicated, such practice is not desirable since it detracts from the overall effect of a table having the natural appearance of a tree.

Base 26 is secured to truncated limb 24 in any suitable manner known in the furniture art. The tree portion and base are then finished in any suitable manner such as by the application of a number of coatings of varnish. The clear finish is likewise preferred so as the enhance the natural grain appearance. Obviously, however, other types of finishes may be applied.

The table 10 resulting from the method thus differs from conventional tables made from natural tree portions not only by the manner in which the table is made, but also asthetically as well as functionally. Thus, for example, whereas conventional tables resulting from transverse cuts are severly limited in size by the tree diameter, table 10 may be of indefinite length. If, for example, an extremely long length is selected, plural limb portions may be utilized to provide the necessary support. Table 10 also differs asthetically and functionally from such prior art tables in that a separate table top is not necessary, but rather the trunk portion itself is utilized as the table top. Base 26 is included to provide added stability for the table 10 and enhance the pedestal effect.

As previously indicated base 26 may be formed in various manners without concepts of this invention. A further approach, differing from FIG. 1, is to simultaneously form a pair of trunk segments by a pair of parallel longitudinal cuts rather than the single cut of FIG. 1. In this manner a flat slab would be created at the tree heart between the cuts and the slab could be then utilized to form base 26. This would be particularly advantageous in that the grain formation from, for example, two base members resulting from cutting the slab in half would result in the same grain formation as on the trunk segments to which the bases 26 could be secured.

What is claimed is:

1. A method of making a table comprising the steps of cutting the trunk of a natural tree at spaced locations transversely with respect to its longitudinal axis to create a trunk portion, cutting the trunk portion longitudinally with respect to its longitudinal axis to divide the trunk portion into trunk segments with at least one trunk segment having a flat horizontal surface resulting from the longitudinal cut and having one limb integral with and extending perpendicularly therefrom at generally the longitudinal central area of the trunk segment, cutting the limb to create a limb portion with a flat surface remote from the flat surface of the trunk segment and parallel thereto, and providing a base on the limb portion with a flat surface parallel to the flat surface of the trunk segment whereby the flat surface of the trunk segment comprises the table top and the limb comprises a pedestal support therefor with the parallel flat surface of the base being the support surface thereof.

2. The method of claim 1 including securing a separate base to the limb with the lower portion of the base comprising the flat support surface.

3. The method of claim 2 wherein the base is formed from a portion of a natural tree.

4. The method of claim 3 wherein a base is formed by parallel longitudinal cuts of a portion of a natural tree.

5. The method of claim 4 including the steps of debarking and sanding the trunk segment and limb portion and the base, thereafter securing the base to the limb portion, and providing a finish on the base and the trunk segment and the limb portion.

6. The method of claim 1 including debarking the trunk segment and limb portion to create a debarked tree portion, sanding the debarked tree portion, and applying a finish to the sanded debarked portion.

7. A table comprising a portion of a natural tree including a portion of the trunk and a portion of one limb extending perpendicularly therefrom and integral therewith, said limb portion being located at generally the longitudinal central area of said trunk portion, said trunk portion having a flat upper horizontal surface with an exposed grain resulting from a cut longitudinally with respect to the trunk axis, said limb portion having a flat surface remote from said trunk portion upper surface and parallel thereto, said trunk portion upper surface comprising a table top, and said limb portion comprising a pedestal support therefor, and said limb portion flat surface comprising a support surface parallel to said upper surface table top.

8. The table of claim 7 including a base secured to said flat surface of said limb portion, and said base having a lower flat portion which comprises a support surface.

9. The table of claim 8 wherein said base is formed from a segment of natural tree.

10. The table of claim 9 wherein said base includes an upper surface remote from said support surface of said base with both said upper surface and said support surface of said base resulting from longitudinal cuts of a natural tree.

11. The table of claim 9 wherein said trunk and limb portions and said base are debarked.

* * * * *